(12) United States Patent
LaMedica, Jr.

(10) Patent No.: US 7,024,161 B1
(45) Date of Patent: Apr. 4, 2006

(54) MODULAR WIRELESS DEVICE TEST SET

(75) Inventor: Louis LaMedica, Jr., Pittstown, NJ (US)

(73) Assignee: Cellco Partnership, Bedminster, NJ (US)

( * ) Notice: Subject to any disclaimer, the term of this patent is extended or adjusted under 35 U.S.C. 154(b) by 1011 days.

(21) Appl. No.: 09/924,117

(22) Filed: Aug. 8, 2001

(51) Int. Cl.
    *H04B 17/00* (2006.01)

(52) U.S. Cl. .................. 455/67.11; 455/423; 455/424; 455/425

(58) Field of Classification Search ........ 455/423–425, 455/67.11, 67.14, 67.4, 566; 370/241, 249
See application file for complete search history.

(56) References Cited

U.S. PATENT DOCUMENTS

| | | | |
|---|---|---|---|
| 5,095,500 A | | 3/1992 | Tayloe et al. |
| 5,425,076 A | | 6/1995 | Knippelmier |
| 5,465,390 A | | 11/1995 | Cohen |
| 5,481,588 A | | 1/1996 | Rickli et al. |
| 5,596,570 A | | 1/1997 | Soliman |
| 5,793,221 A | * | 8/1998 | Aoki ........................... 324/770 |
| 5,943,617 A | * | 8/1999 | Nakamura .................. 455/423 |
| 6,052,584 A | | 4/2000 | Harvey et al. |
| 6,434,364 B1 | * | 8/2002 | O'Riordain .............. 455/67.11 |
| 6,640,101 B1 | * | 10/2003 | Daniel ......................... 455/423 |
| 6,662,009 B1 | * | 12/2003 | Lynn ........................... 455/424 |
| 6,721,541 B1 | * | 4/2004 | Kingsley ................ 455/67.11 |
| 6,819,924 B1 | * | 11/2004 | Ma et al. ..................... 455/425 |

OTHER PUBLICATIONS

Hsu, et al, U.S. Appl. No. 09/123,454, "Digital Wireless Telephone System for Downloading Software to a Digital Telephone Using Wireless Data Link Protocol," filed Jul. 28, 1998.

* cited by examiner

Primary Examiner—Erika A. Gary
Assistant Examiner—Wayne Cai
(74) Attorney, Agent, or Firm—McDermott Will & Emery LLP

(57) ABSTRACT

The present invention relates to a test set for testing the service of a wireless telephone in a wireless network. In embodiments of the present invention, the wireless telephone is modular and can be implemented in the test set without hardwiring. In embodiments of the present invention, the modular wireless telephone is implemented in the test set through the use of a video capturing device and a controller that reads data directly from the display of the modular wireless telephone and deciphers information displayed on the display of the modular wireless telephone.

28 Claims, 6 Drawing Sheets

MODULAR WIRELESS DEVICE TEST SET

FIELD OF THE INVENTION

The present invention relates to the remote testing of wireless telephones and wireless networks.

BACKGROUND

Wireless telephones and wireless networks have been developing rapidly. As the demand for wireless communications has increased, wireless telephones have improved along with the wireless networks on which the wireless telephones operate. These improvements are apparent from the improved quality of service and the increase of features available on wireless telephones. As wireless service providers provide more wireless telephone features through their wireless networks, new wireless telephones with additional capabilities must be implemented and distributed to wireless telephone customers. The wireless telephone market is very competitive and wireless service providers are racing to offer their customers more wireless telephone features.

As more and more features become available to wireless customers, wireless service providers promote new telephones capable of supporting these new features. This rapid development of wireless technology creates a situation where wireless service providers are constantly adapting new wireless telephones and telephone features to their wireless network. Accordingly, new wireless telephones are tested on the service provider's wireless network. Wireless telephones are also programmed to support new features.

Wireless service providers normally focus their services on particular geographic regions. The wireless service provider will maintain wireless networks in particular geographical regions. These wireless networks are designed to service their customer's wireless telephones. However, when a wireless customer leaves their wireless service provider's network, the wireless customer may still have wireless service. In these situations, the wireless customer is roaming.

Roaming is when a wireless telephone uses the wireless network of another wireless service provider. In some instances, the wireless service provider to which a wireless customer subscribes will have an arrangement with other wireless service providers in regions where the wireless service provider does not maintain a wireless network.

Wireless service providers do not have control of other wireless service providers' networks. Roaming in other wireless service providers' networks is both technically and administratively involved. Wireless service providers also provide wireless features on telephones that are roaming in other wireless telephone providers' networks. To provide these wireless features, the wireless service provider must coordinate with the other wireless service provider on both a technical and administrative level.

Due to the complexity of coordination between different wireless service providers, it is often very difficult for a wireless service provider to verify that their wireless telephones are operating as anticipated in other wireless service providers' networks which they do not control. Although a new model telephone may work in the home area of the customer's service provider, it may not work properly in some areas where the customer roams because other carrier's networks may not yet have been upgraded to support that model. Similarly, a new feature that works in the home area may not work while roaming in another area, because the carrier in the other area has not yet installed (or forgotten to turn on) that feature in one or more switches of the other carrier's network. From a customer service standpoint, it is important that the wireless service provider ensure that the wireless features operate during roaming. This is especially important, if the wireless service provider has advertised that wireless features will operate during roaming.

Wireless service providers are also faced with the similar difficulty of coordinating compatibility in different parts of their own network. One reason for this is that many wireless service providers are actually a conglomerate of wireless service providers. Also, different wireless services may have merged together to form a larger network. As a result, there are technical and administrative differences throughout the network.

Accordingly, there is a need for wireless service providers to be able to test and correct the service of their wireless telephones within their network and in other wireless service providers' networks. This need must be cost effective, so that wireless service providers can sell their service to wireless customers at a competitive price. This need also must to be implemented in a short amount of time, to correct technical and administrative problems as they occur.

SUMMARY OF THE INVENTION

The present invention alleviates the problems set forth above by enabling a wireless service provider to remotely test a wireless device in their wireless network and other wireless service providers' wireless networks. Accordingly, embodiments of the present invention relate to methods of testing a wireless device and the wireless networks on which wireless devices operate. Embodiments of the present invention also relate to the systems which test the operation of wireless devices and wireless networks. In the concept of the present invention, the wireless service provider implements test sets throughout their wireless network and throughout other wireless service provider's wireless networks. The test sets are designated to be remotely controlled and possess the ability to test a variety of the wireless device features. The test sets are also designed to test the availability of wireless service.

The remote testing of wireless telephones prevents the necessity of a technician to travel to locations throughout wireless networks to manually test for and correct problems with wireless devices. Such traveling can be cost prohibitive for wireless service providers. The present invention also enables the remote reprogramming of wireless devices to test wireless service so as to respond to customers complaints in a short response time.

Another feature of the present invention is the wireless service providers ability to quickly and efficiently upgrade the wireless device in a test set. The amount of time needed to upgrade test sets throughout wireless networks is crucial for the wireless service providers, as wireless telephones and telephone features are evolving quickly. The test set of the present invention is designed such that a wireless telephone in the test set is modular and easily replaceable without hardwiring.

One complication to implementing wireless devices in test sets is that wireless devices are generally not designed such that all the information and indications of features are accessible from the data port on the wireless device. Accordingly, to download information from a wireless device directly, hardwiring alterations to the wireless device are necessary. The only way to access some information from the device, without making hardwiring alterations, is to manually read the data off of the display. Such data may include indications of caller ID, wireless internet services, voice-mail notifications, wireless messaging indications, signal strength. Also, other features are auditory and are not accessible from the data port on the bottom of the telephone. Such an auditory feature is voice activation of the wireless telephone.

In preferred embodiments of the present invention, the wireless device is implemented in a test set, without hard-wiring, utilizing a video capturing device. The wireless device is installed in the test set by utilizing the data port on the wireless device to control and read as much data from the wireless device as possible. A video capturing device (i.e. a CCD camera) is implemented to read information off of the display of the wireless device, so that the test set can receive additional information about the performance of the wireless device in the wireless network in which the test set is situated. A controller corresponds with the wireless device through the data port to read information, reprogram the wireless device, and operate the wireless device. The video capturing device is also connected to the controller to read information output from the display of the wireless device. The controller is able to decipher the information read by the video capturing device to determine if particular wireless features are working. The test set is in communication with a Central Test Control Center, which remotely controls the test set to implement tests and received test results. The Central Test Control Center also sends the wireless device wireless signals through a wireless network.

BRIEF DESCRIPTION OF DRAWINGS

The drawings depict the present invention by the way of example, not by way of limitations. In the figures, like reference numerals refer to the same or similar elements.

FIG. 1 is a functional block diagram of one embodiment of the inventive test set and portions of the networks it communicates through.

DETAILED DESCRIPTION OF THE PRESENT INVENTION

Aspects of the present invention relate to a test set for remotely testing a wireless telephone on a wireless network and to methods of testing telephone and network feature functionalities using the test set. In embodiments of the present invention, the wireless telephone in the test set is modular and does not require hardwiring to implement the wireless telephone into the test set. Essentially, an off-the-shelf telephone can simply be plugged-into the test set. This test set is also remotely controlled by a Central Test Control Center so that wireless telephone features and network services can be readily tested by centrally located technicians.

Figure 1:
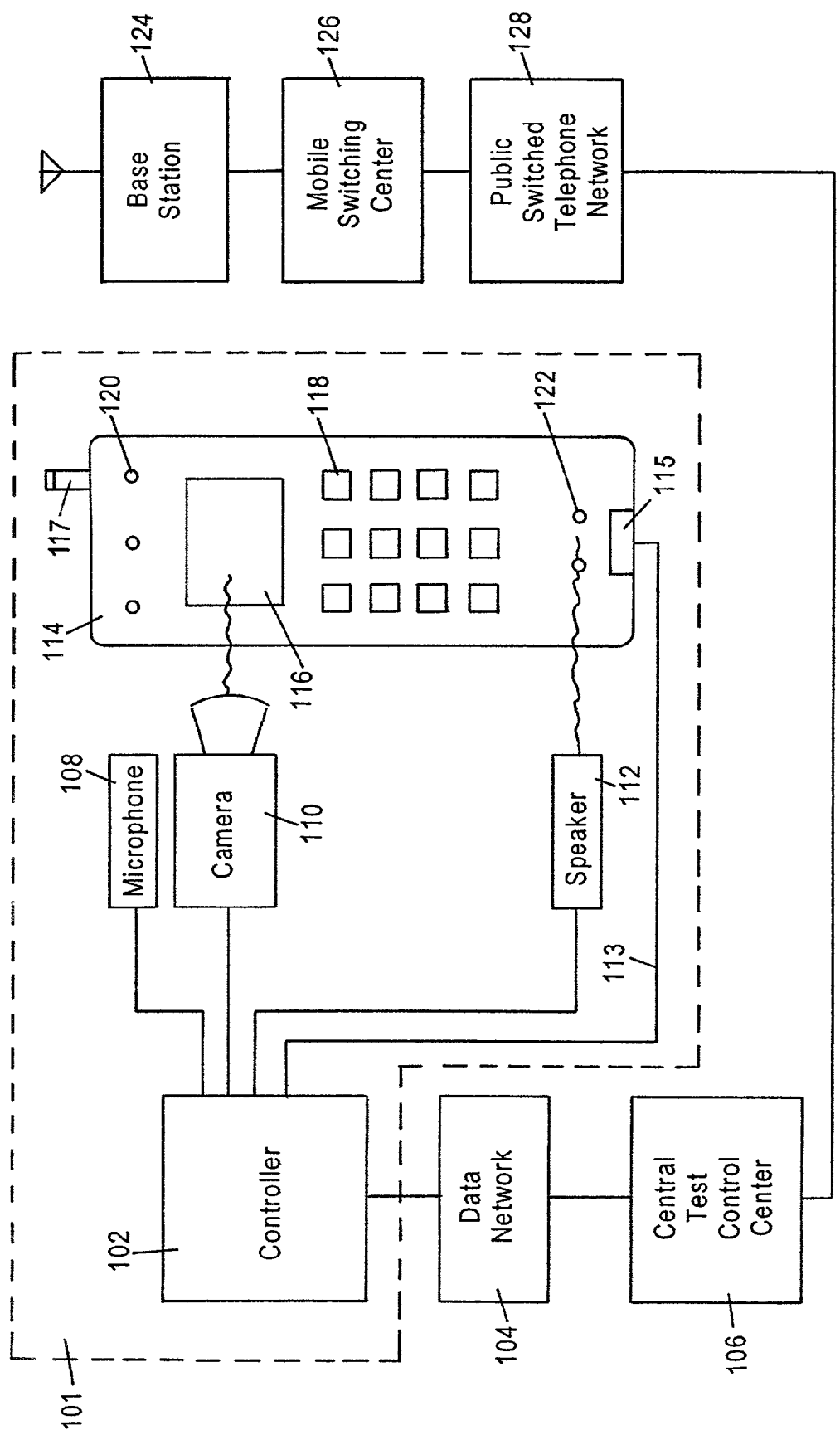

FIG. 1 is a functional block diagram of the inventive test set 101 and the inventive test set's interaction with a wireless network and Central Test Control Center 106. The basic elements of the test set 101 are a controller 102 and a modular wireless telephone 114. The controller 102 is connected to the wireless telephone 114 through the wireless telephone's I/O port 115 through electrical line 113. Through electrical line 113, the controller 102 can control many features of the wireless telephone 114. Such control includes dialing numbers, reprogramming the wireless telephone's telephone number, and reprogramming the software on which the wireless telephone 114 operates. The software on which the wireless telephone 114 operates is crucial to the wireless telephone's 114 ability to be compatible in various wireless networks.

The controller also provides instructions to the telephone through the port, for some test operations. For example the controller may instruct the telephone to initiate a call to a specified number and/or to access a particular network service feature. Some limited data from the wireless telephone is available to the controller via the port 115. However, not all of the data output by the wireless telephone 114 and the operating characteristics are available to the controller 102 through the I/O port 115. A camera 110 is connected to the controller 102 for reading data output from the display 116 of the wireless telephone 114. The data read from the camera 110 is input into the controller 102 to be deciphered and processed. The camera 110 is aimed at the display 116. In embodiments of the present invention, the camera can be also aimed at other visual output features, such as the keypad.

A microphone 108 may be arranged in the test set 101 proximate to the speaker 120 of the wireless telephone 114. The microphone 108 is electrically connected to the controller 102. The microphone 108 receives auditory outputs from the wireless telephone 114 from the speaker 120 and sends these outputs to controller 102 to be deciphered and interpreted. The exemplary test set 101 further includes a speaker 112 electrically connected to the controller 102. The speaker 112 is arranged to input auditory signals to the microphone 122 of the wireless telephone 114.

The controller 102 is connected to a data network 104. The data network 104 may be a wireless data connection or a wireline data connection such as a dial-up data link through the PSTN. Through the data network 104, the controller 102 is in communication with the Central Test Control Center 106. The Central Test Control Center 106 is the centralized location for a wireless service provider to remotely control a plurality of different test sets located throughout their wireless network and other wireless service providers networks to test their services of the wireless telephones 114.

The Central Test Control Center 106 is also connected to a Public Switched Telephone Network (PSTN) 128. In turn the PSTN 128 is connected to the Mobile Switching Center (MSC) 126 which provides wireless communication service to the wireless telephone 114 through the base station 124. The Central Test Control Center 106 can communicate with other test sets, similar to test set 101, in other geographic regions or serviced by other MSCs. The Mobile Switching Center 126 is in communication with the base station 124, which is in wireless communication with the wireless telephone 114 through antenna 117. Through base station 124, the Central Test Control Center sends wireless test signals to wireless telephone 114. These wireless test signals can include telephone calls to the wireless telephone 114, sending of wireless messages to the wireless telephone 114, voice-mail notifications, wireless internet data, caller ID data, indications of digital service, and other wireless data. The reaction of the wireless telephone 114 to these wireless test signals is detected by the controller 102 and communicated back to the Central Test Control Center 106 through the data network 104. The central test control center 106 can then compare the output from the wireless telephone 114 with the expected result from the test signal sent through the base station 124.

The Central Test Control Center 106 also instructs the test set 101 through the data network 104, for example to initiate outgoing test calls and or request predetermined service features. Again, the controller 102 monitors operations of the telephone 114 during such tests and reports results to the Center 106 via the data network 104.

It is often necessary for a wireless service provider to accommodate for new wireless devices, such as a new model wireless telephone 114, within their wireless network and the wireless networks in which such wireless devices may be roaming. This implementation of a new wireless device makes it necessary for wireless service providers to upgrade test sets, such as test set 101. A new wireless device may have upgraded features, which the inventive test set 134 can easily accommodate. The inventive test set 101 can accommodate a new wireless device by simply coupling the controller 102 to the new wireless device and visually coupling the video capturing device 110 to the display of the upgraded device. The microphone 108 and speaker 112 may be adjusted to provide the desired audio coupling to the new model telephone for testing of audio wireless features, such as voice activation functions. Software can then be used to coordinate interaction between the components of the test set 101 and the wireless device. In embodiments of the present invention, a new wireless device can be accommodated in a test set without hardwiring.

Figure 2:
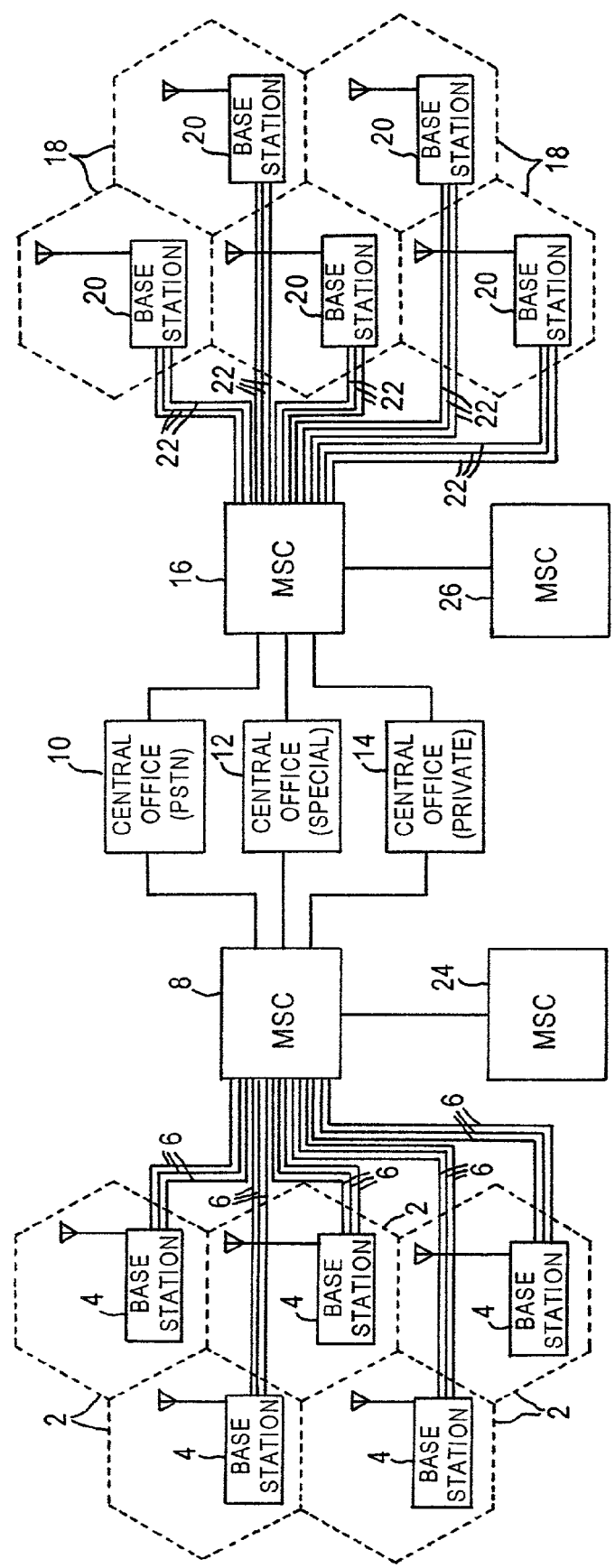
FIG. 2 is a depiction of a plurality of wireless networks.

FIG. 2 depicts a global perspective of a wireless network including a plurality of Mobile Switching Center (MSCs) 8,16. The MSCs are each connected by respective trunk lines 6, 22 to several respective base stations 4, 20 in respective adjacent cell sites 2, 18. Note that MSCs 8,16 are connected by regular telephone trunk lines to various central offices. Such central offices include a Public Switched Telephone Network (PSTN) 10, a special switching office 12 (e.g. "911" emergency service), and a private switching office 14, (i.e. private long distance carriers). MSCs 8,16 may also be connected to neighboring MSCs 24, 26.

The MSCs 8 and 24 and the associated base stations may form one regional network, for example operated by one carrier. The MSCs 16 and 26 and the associated base stations may then form a second regional network, for example operated by a second carrier. Each carrier has a need to test new telephones and features within its own region. Because of roaming agreements, each carrier also has a need to test operation of new handsets and features in a manner that approximates roaming through the other carrier's region.

Figure 3:
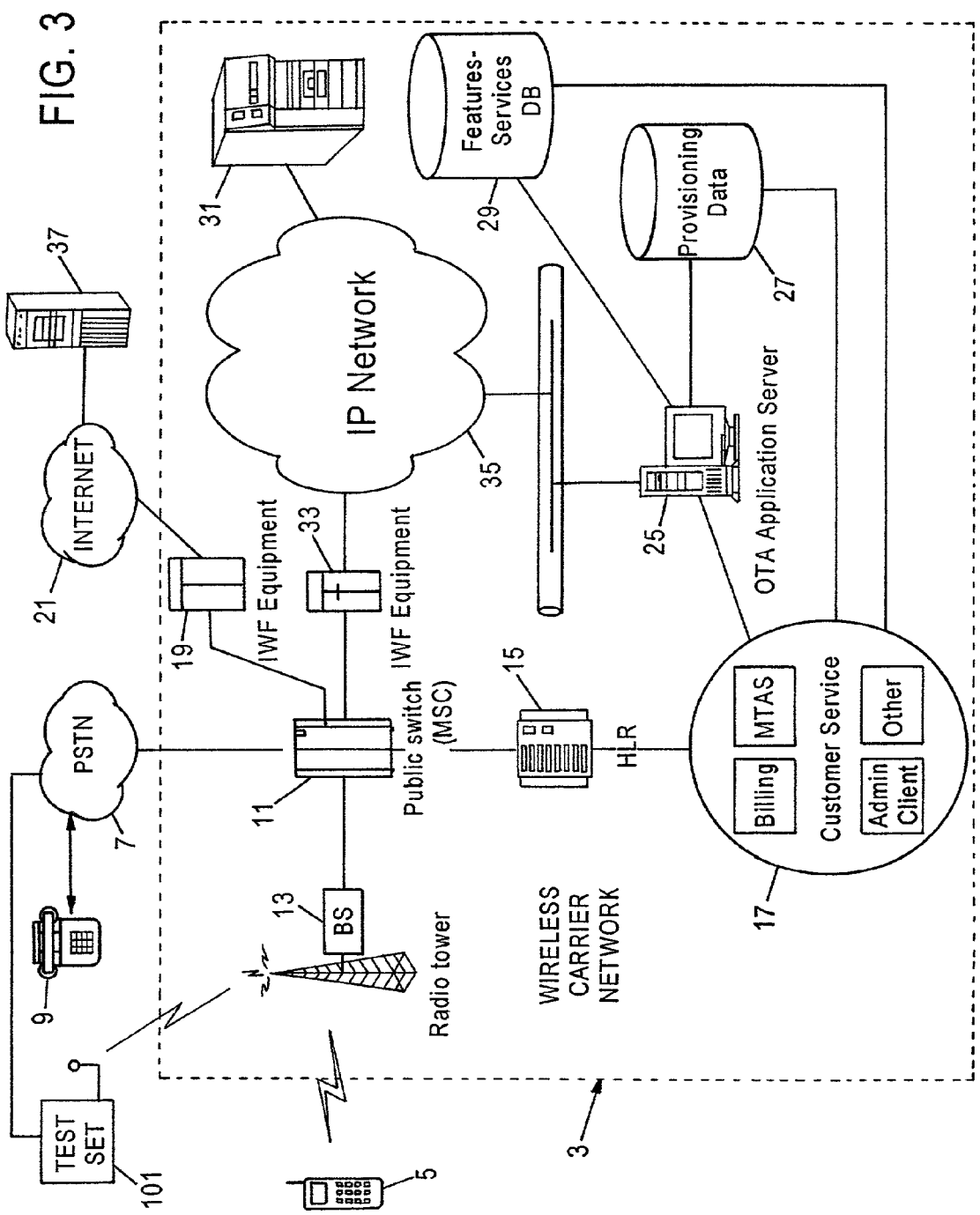
FIG. 3 is a simplified block diagram of a public wireless telephone network showing systems used for provisioning a handset.

FIG. 3 depicts a system level perspective of the wireless network depicted in FIG. 2. This depiction shows the system providing voice telephone communications as well as data communications services. Although the invention may apply to other types of wireless networks, as shown, a wireless telephone network 3 provides cellular or personal communications service (PCS) type services to mobile stations depicted by way of example as mobile handsets 5. The network 3 enables users of the mobile stations 5 to initiate and receive telephone calls to each other as well as through the Public Switched Telephone Network (PSTN) 7 to landline telephones 9.

The network 3 includes a number of mobile switching centers (MSCs) 11, one of which appears in the drawing for simplicity of illustration. Each MSC 11 connects through trunk circuits to a number of base stations (BSs) 13, which the MSC controls. Through the MSC 11 and the base stations 13, the network 3 provides voice-grade digital telephone services over the common air interface to and from the mobile stations 5. The network elements also may provide data services over the logical communication channels, as discussed more later.

The mobile stations 5, the MSCs 11 and the base stations 13 implement one or more standard air-link interfaces. For example, the wireless telephone network 3 may support dual-mode services. Although not shown separately, such a dual-mode network includes wireless telephone components that output analog telephone signals for transmission according to an analog wireless protocol (e.g., AMPS) as well as digital wireless system components that operate in accord with a digital wireless protocol. Digital wireless equipment is available today to support any one of several common interface standards, including time division multiple access (TDMA) and the Global System for Mobile communications (GSM). In the preferred embodiment, the digital wireless telephone components support the code division multiple access (CDMA) standards, for example the CDMA protocol IS-95. The equipment may also support the newer CDMA 2000 or UMTS (Universal Mobile Telecommunications System) standards. The base stations may provide both types of services. Alternatively, the network may comprise base stations that send and receive voice and signaling traffic according to the prescribed analog protocol as well as digital base stations that utilize the digital wireless protocol. Each dual-mode MSC typically includes a switching subsystem for analog telephone services, a switching subsystem for digital telephone services, and a control subsystem. Other MSCs may implement only one type of service.

As noted, the preferred digital equipment provides CDMA service. With CDMA, each transmitted signal comprises a different pseudorandom binary sequence, also referred to as a pseudonoise (PN) sequence, which modulates a carrier signal, spreading the spectrum of the waveform. Thus, since each CDMA subscriber unit is assigned a unique PN code, a plurality of subscriber stations can send and receive CDMA signals sharing the same frequency spectrum. If these CDMA signals were viewed in either the frequency or time domain, the multiple access signals would appear to be superimposed on top of each other. The CDMA signals are separated in the receivers of the base stations or the subscriber stations by using a correlator which accepts only signal energy from the selected binary PN sequence and despreads its spectrum. The CDMA signals from other sources, whose codes do not match the selected binary PN sequence, are not despread in bandwidth and as a result, contribute only to the background noise and represent a self-interference generated by the system.

As will be familiar to those of ordinary skill, an air-link interface for each cellular service in a geographic area includes paging channels and/or signaling channels, as well as actual communications channels for voice and/or data services. The channels may be separate frequency channels, or the channels may be logically separated, for example based on time division or code division. The paging and signaling channels are used for preliminary coded communications between a cellular telephone and a cell site in setting up a telephone call or other session, after which a communication channel is assigned or set up for the telephone's use on that call.

The wireless network 3 includes a home location register (HLR) 15 that stores subscriber profiles for each of the wireless subscribers and their associated digital wireless telephones 5. The HLR 15 may reside in the home MSC 11 or in a centralized service control point that communicates with the MSC(s) via an out-of-band signaling system such as an SS7 network. As recognized in the art, the HLR 15 stores for each mobile subscriber the subscriber's mobile telephone number, the mobile identification number, and information specifying the wireless services subscribed to by the mobile subscriber, such as numeric paging or text-based paging, data communication services, etc.

The carrier also operates a number of different systems in one or more customer service centers 17. These systems include one or more billing systems, network provisioning systems such as the Mobile Telephone Administration System or "MTAS", client account administration systems, and the like. The billing system, for example, receives usage and operations data from the MSCs 11 and processes that data to generate bills for individual subscriber and to forward data regarding users roaming through the carrier's service area through a clearinghouse (not shown) for reconciliation. The MTAS provides data to the HLR 15 and/or to the MSCs 11 to provision services for new stations 15 and modifies provisioning data as customers change their subscriptions to obtain different sets of services from the carrier.

In the more advanced implementations of cellular networks, such as the network 3, the carrier provides data communication services in addition to voice-grade telephone services. For example, the network 3 may include interworking function (IWF) equipment 19. This equipment provides a multi-call interface to communication links from the MSC 11 and typically implements a firewall function. In this manner, the IWF equipment essentially looks like a dial-up interface to a data network such the public packet-switched network now commonly known as the Internet 21.

The user essentially makes a data call from the handset 5 to the IWF equipment 19. The equipment 19 answers the call and executes a handshake and log-in routine to validate the handset 5 and in some cases to validate the individual user. The IWF equipment 19 temporarily assigns an Internet Protocol (IP) address to the handset for the duration of the data communication. The equipment then provides a two-way data interface, with appropriate protocol conversions, enabling data access to the Internet 21. If desired, the IWF equipment may also initiate dial-out type procedures to push data communications from the Internet 21 through the network 3 to the particular handset 5.

As part of the provisioning of a new digital cellular telephone station 5 or test set 101, it is necessary to download certain data into the new station 5. To automate this procedure, the carrier operates an over-the-air (OTA) provisioning server 25. A provisioning database 27 stores data sets necessary to provision stations 5 or test sets 101 for the various services offered through the network 3 as well as a data table of all stations 5 served through the network 3 and the services currently provide to each station. When the new station 5 or test set 101 comes on-line, the customer service center 17 will establish a record for that station 5 test set 101 in the provisioning database 27. The OTA application server 25 may also be utilized to provision a test set 101, in response to instructions from the Central Test Control Center 106. Such provisioning may be a necessary aspect of testing the wireless service in a particular wireless network.

The provisioning database 27 is accessible by the OTA application server 25. The database 27 may be a program run on the server computer or it may reside in a separate computer in communication with the server 25. In a similar manner, the OTA application server 25 has access to a feature services database 29, running on the computer 25 or in a separate computer.

Interworking function (IWF) equipment 33 provides a data interface similar to that provided by the equipment 19. The IWF equipment 33, however, provides an interface to a private data network operated by the carrier, shown as an IP network 35. The IWF equipment 33 and the IP network 35 provide data communications to the OTA application server 25 and the web page server 31.

The hardware of a server system, such as the server 25 or the server 31, corresponds to that of a typical general-purpose computer, comprising a central processing unit (CPU) formed of one or more microprocessors, a number of memory devices and an interface to the data communication network, in this case to the IP network 35. Such a computer may also provide a graphical user interface (GUI) for local operation and control, for example comprising a common type of display, a keyboard and one or more of the common types of cursor controls. Various media, readable by such a system, may store or carry the executable code and any associated data, for the web pages provided by the server 31 or for the provisioning data and feature module downloading performed by the OTA application server 25. Examples of such media include semiconductor and disk type memories, digital tapes, and the like. Computer readable media used by such systems also include various types of signals sent and received by computer systems for loading software code and associated data into the memory and/or the CPU of the system hardware and sending and receiving web pages and/or plug-in modules via the IP network 35, the MSC 11, the base station 13 and the air-link.

When the user first obtains a new station 5, the user operates the cellular telephone to call the customer service center 17 to initiate provisioning. The MTAS system provides provisioning data to the network elements. The customer service systems 17 also set up an entry for the station 5 in the database 27. Once the account is set up, the user initiates a data communication with the OTA application server 25, and the server downloads data such as the mobile identification number to provision service in the handset 5, itself. Likewise, when a test set 101 is provisioned, the Central Test Control Center 106 may set up an entry for the test set 101 in the database 27. Once the account is set up, the Central Test Control Center 106 initiates data communication between the test set 101 and the OTA application server 25 and the server download data. A more detailed description of the over-the-air provisioning operations appears in commonly assigned U.S. patent application Ser. No. 09/123,454, filed on Jul. 28, 1998, by Hsu et al., entitled DIGITAL WIRELESS TELEPHONE SYSTEM FOR DOWNLOADING SOFTWARE TO A DIGITAL TELEPHONE USING WIRELESS DATA LINK PROTOCOL.

As part of the data communication session with the OTA application server 25, the station 5 or test set 101 may also communicate with the web page feature selection server 31. Alternatively, the user may initiate a later session with the servers 25 and 31. In any of these sessions, the user reviews lists and/or descriptions of features available via the network 3 and selects the set of features that the user desires for the new station 5 or test set 101. When the subscriber has selected a desired feature or package of features, the selection information is forwarded to the OTA application server 25. The server updates the customer's or test set's record in the feature database 29 to show the selection and notifies the customer service systems 17 of the purchase of the selected feature(s). The OTA application server 25 then transmits instructions, activation codes and/or any software needed to activate the selected features in the handset, through the IP network 35 to the IWF equipment. The IWF equipment converts the packets containing the activation information from the form used on the IP network 35 to a format compatible with transmission through the MSC 11 and the base station 131 and over the air-link to the wireless terminal device 5.

If a purchased feature requires network provisioning, for example, to cause the network 3 to send caller identification data with incoming calls to the handsets, the MTAS application may be instructed to update the customer's network provisioning data in the HLR 15 and/or the home MSC 11. The billing system would then include monthly subscription charges for caller ID services in subsequent bills to the user.

At a later time, the user may initiate a similar procedure to upgrade the telephone or to purchase additional features from the network provider. For this purpose, the user may contact the carrier's systems 25 and 31, as discussed above.

In accord with the invention, the Center 106 can communicate through the data network 104 with the test set 101 to control operations of the test set 101. Of note at this point in the discussions the Center 106 may itself provision the telephone 114. The Center 106 may also control the telephone 114 to execute any of the provisioning techniques outlined above for the regular user handsets 5. In either case, the Center 106 can routinely provision and reprovision the test set 101, as needed to test various functions of the telephone 114 and the regional network.

Figure 5:
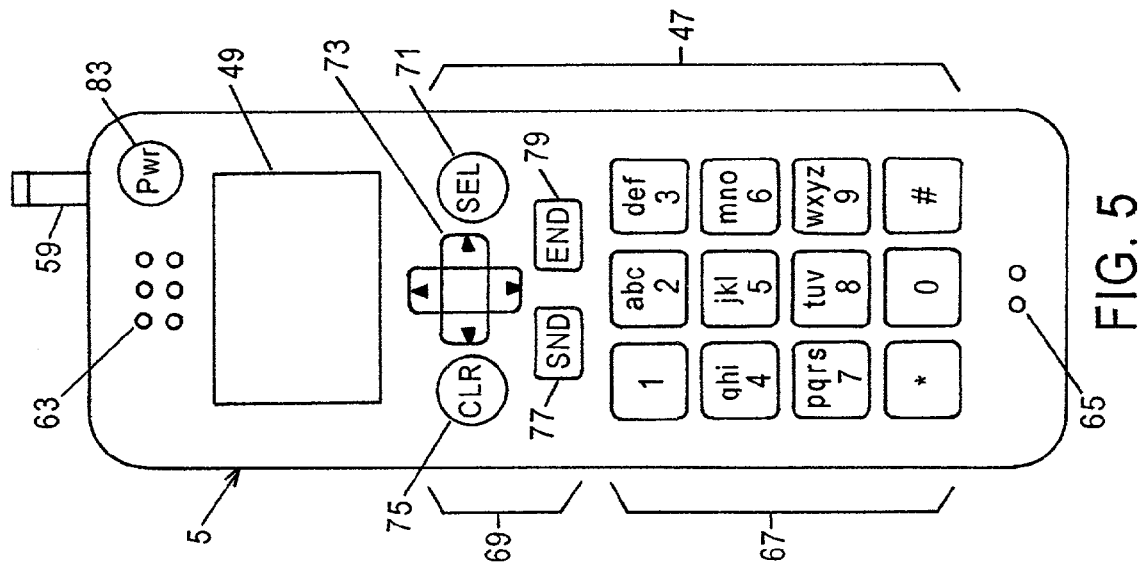
FIG. 5 is a front plan view of the exemplary wireless telephone.
Figure 4:
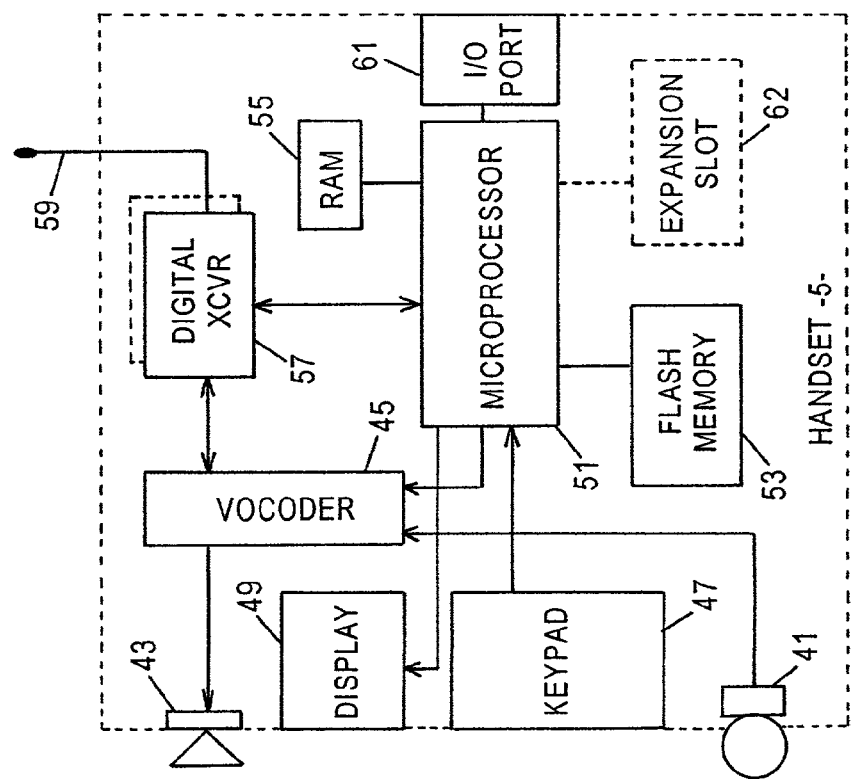
FIG. 4 is a functional block diagram of a exemplary telephone.

It may also be helpful to consider the structure and functionality of a wireless terminal station 5, constructed for operation in accord with the present invention, keeping in mind that models of the station 5 are the same as the various models of wireless telephones that may be used as the telephone 114 in the test set 101. FIG. 4 is a functional block diagram, and FIG. 5 is in a plan view, illustrating a digital telephone station 5, which may be used in an implementation of one or more embodiments of the present invention. For discussion purposes the illustrations show the station in the form of a handset.

The handset 5 functions as a normal digital wireless telephone station. For that function, the station 5 includes a microphone 41 for audio signal input and a speaker 43 for audio signal output. The microphone 41 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of the wireless telephone network communications.

For digital wireless communications, the handset 5 also includes a digital transceiver (XCVR) 57. The invention encompasses embodiments utilizing any type of digital transceivers that conforms to current or future developed digital wireless communication standards. For example, the transceiver 57 could be a TDMA or GSM unit, designed for cellular or PCS operation. In the preferred embodiments, the digital transceiver 57 is a CDMA transceiver. The transceiver 57 provides two-way wireless communication of information, such as vocoded speech samples and digital message information. The transceiver 57 connects through RF send and receive amplifiers (not separately shown) to an antenna 59.

The mobile telephone 5, upon initializing for operation in a CDMA system, acquires the pilot channel of the base station 13, obtains system configuration and timing information for the CDMA system, and begins monitoring the CDMA paging channels. In particular, the mobile station 5 may perform paging channel monitoring procedures while in an idle state. The mobile station 5 may operate in a slotted mode, where only selected slots (e.g., one or two slots per slot cycle) are monitored on the paging channel. Alternatively, the mobile station 5 may monitor all paging and control channels if operating in a non-slotted mode. In either case, the mobile station 5 monitors the paging and control channels for a command, and transmits an acknowledgement upon receiving any message that is addressed to the mobile station 5.

The station 5 may be a dual or tri-mode telephone, in which case the station 5 would include one or more additional transceivers (represented by the dotted line associated with the transceiver 57) conforming to an alternate standard. Initially, the additional transceiver would likely consist of an analog transceiver conforming to the AMPS standard. However, it is within the scope of the invention to include an additional digital transceiver, as well. For purposes of further discussion, however, we will assume presence of a single digital transceiver 57, preferably in the form of a CDMA transceiver.

As shown, the digital telephone handset 5 also includes a display 49 for displaying messages, pages generated by a client browser program, call related information, dialed and calling party numbers, etc. A keypad 47 enables dialing digits for voice and/or data calls and generating selection inputs keyed by the user based on displayed information.

A microprocessor 51 controls all operations of the handset 5. The microprocessor 51 is a programmable device. The mobile unit 5 also includes a flash memory 53 for storing various software routines and mobile configuration settings, such as the mobile identification number (MIN), feature activation information, etc.

The handset 5 further includes a non-volatile random access memory (RAM) 55. The RAM 55 stores operating data, such as telephone numbers and other data input by the user via the keypad 37. The RAM 55 also may store received software, during reception and checking for errors and/or completeness, until the software is ready for loading into the sectors of the flash memory.

The handset 5 also includes one or more I/O ports 61 coupled to the microprocessor 51. The port 61 may enable a user to connect a laptop computer or other data device to the terminal 5, via wire or a short-distance wireless link, for example to enable wireless data communication for the laptop using the handset 5 over the network 3. For purposes of testing, this port 61 also allows a controller to operate the handset 5 to emulate manual operation of the handset 5.

FIG. 5 shows the front of the cellular mobile station 5, in the form of a portable handset. As shown, the handset housing includes openings 63 enabling sound to emerge from the speaker 43, as well as openings 65 to allow input of sound to the microphone 41.

The handset 5 includes the visible display screen 49. The handset 5 also includes various keys making up the keypad 47. The keypad 47 typically includes at least two sets of keys 67, 69. The keys 67 represent dialing-input keys. Typically, each of the twelve keys is imprinted with a number from 1 to 0, an asterisk or star (*), and a number sign (#). Each of the keys 2 through 9 is imprinted with three or four letters, to enable input of alphabetical information.

The keys 69 are function keys. Exemplary function keys include a cursor control or scrolling key 73, a selection (SEL) key 71, a clear (CLR) entry key 75, a send (SND) key 77 and an END key 79. The send (SND) key 77 is used to initiate or answer a wireless call, and the "END" key 79 is used to terminate a wireless call.

Although other keys with other functions and/or labels may be used in place of or in addition to those shown, FIG. 5 shows three of the function keys for input of information to and retrieval of information from the processor and memory of the handset and/or selection of features from a displayed menu or web page. One of these keys is the cursor key 73. This key at least controls up and down movement of a displayed cursor or highlight function and attendant scrolling of menus or pages shown on the display 49. In the illustrated embodiment, the key 73 also provides a left or right input for side-to-side cursor control. The exemplary keys also include the selection (SEL) key 71, which enables a user to select an option indicated by the cursor or highlighting. The clear (CLR) key 75 enables the user to erase a selection. A wide variety of other cursor controls and selection inputs could be used.

The keypad 47 supplies user input information to the microprocessor 51, and the microprocessor provides digital data signals to cause the display 49 to show appropriate information to the user. Under control of the microprocessor 51, the display 49 shows textual information, such as dialed numbers and name and number information regarding stored speed dialing lists. The display 49 also may have certain specialized indicators, such as a message-waiting indicator and various roaming or home service indicators, voicemail notifications, or indications of other wireless features.

Hence, under control of the microprocessor 51 and its programming, the keypad 47 and the display 49 provide a graphical user interface allowing the customer to input information and receive information. The preferred user interface includes a wireless application protocol (WAP) type web browser. When used as the telephone 114 in a test set 101, a camera and a programmed controller obtain information from the display, representing operation of the phone through the wireless network, in much the same way as a user does while operating the handset 5.

To make a routine telephone call, a user dials in the destination number by actuating the appropriate ones of the number keys 67 and then pushes the send (SND) key 77. When used as a test set, the telephone receives the number and sends one or more commands from the controller via the I/O port 115 (FIG. 1). In either case, the microprocessor 51 generates a call request message in the appropriate protocol. This message includes the input destination number. The microprocessor causes the digital transceiver 57 to send the message, as a signaling message, for example over the signaling channel of the particular wireless air-interface to a base station, for call set-up processing by the network 3.

Of course, the user interface provided through the display 49 and the keypad 47 also allows the user to select and operate the various terminal features provided by the network. For example, the user may select the speed dial list and then activate the key 73 to scroll through the list as shown on the display 49. Upon viewing a desired item in the list, the user may activate keys to edit the name or number shown under the listed item or push the send (SND) key 79 to activate the station 5 to call the listed party. The microphone and speaker may also serve as elements of the user interface, for example, if a feature or selection entails announcements and/or speech-recognition of inputs from the user. Such an interface strategy allows use of a speech recognition based speed dialing feature, to automatically initiate hands-free calls. The test set interface allows the test set controller to operate the telephone in a similar fashion and monitor outputs returned via the display and possibly via the handset speaker.

Figure 6:
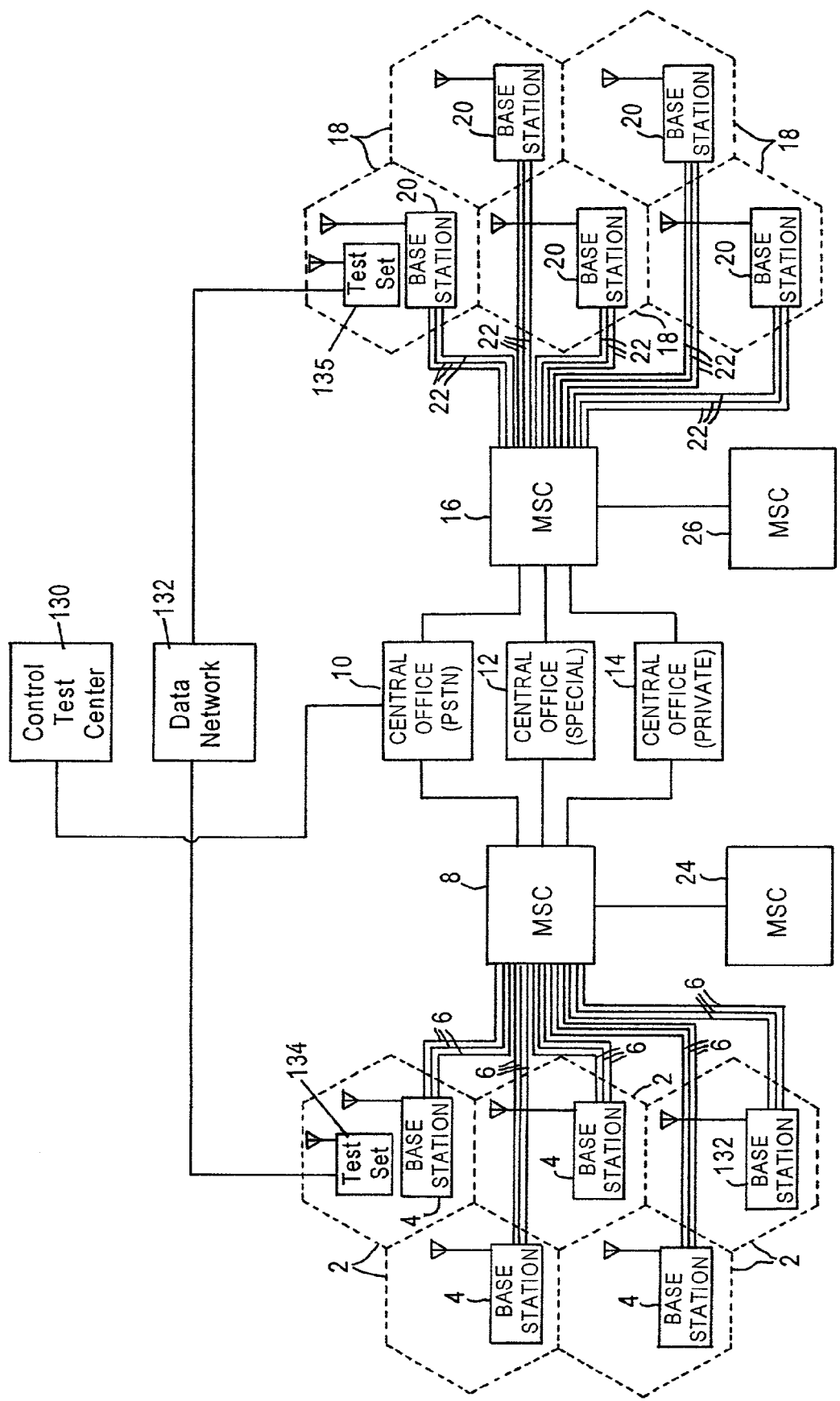
FIG. 6 is a depiction of a wireless network with the implementation of one embodiment of the inventive test set.

FIG. 6 is a diagram of the network implementation using the inventive test set 134. Mobile Switching Center (MSC) 8 services of plurality of base stations 4. The plurality of base stations form a web of cells 2. Accordingly, the MSC 8 provides wireless service to all of cells 2. MSC 8 is connected to a Public Switched Telephone Network, which connects wireless telephone calls to their destination. Similarly, MSC 16 services a plurality of base stations 20 forming a web of cells 18. MSC 8 and MSC 16 may or may not be operated by the same wireless service provider. Accordingly, it can be appreciated that MSC 8 provides the same services through all the base stations 4 and MSC 16 provides the same service through all the base stations 20.

Test set 134 is strategically placed in one of the cells 2 proximate to one of the base stations 4. The test set 134 serves to test the service of a wireless telephone, in a particular set of cells 2. Accordingly, test set 134 tests the services and features of the telephone therein as it operates through the cells 2 and the MSC 8. Similarly, the test set 135 tests the services and features of the wireless telephone in test set 135 as it operates through the cells 18 and the MSC 16. Both MSC 8 and MSC 16 communicate over a Public Switched Telephone Network with the Central Test Control Center 130. The Central Test Control Center 130 communicates with the test sets 134, 135 through data network 132. The data network 132 may either be a wireline network or a wireless network.

In embodiments of the present invention, the inventive concept relates to a method of testing operation of a wireless device in a wireless communication network. Within the concept of these embodiments, test instructions are received at test sets 134, 135 from a Central Test Control Center 130. An operation is initiated through a base station and an MSC to attempt to access a service feature of a wireless device. Data is captured from the display of the wireless device in the test set. The controller recovers information that is output from the wireless device via the display by processing the captured data to recover information output from the wireless device via the display. Test result data is supplied to the Central Test Control Center according to the recovered information by the controller. The test result data is compared at the Central Test Control Center with the expected result from the operation.

Figure 7:
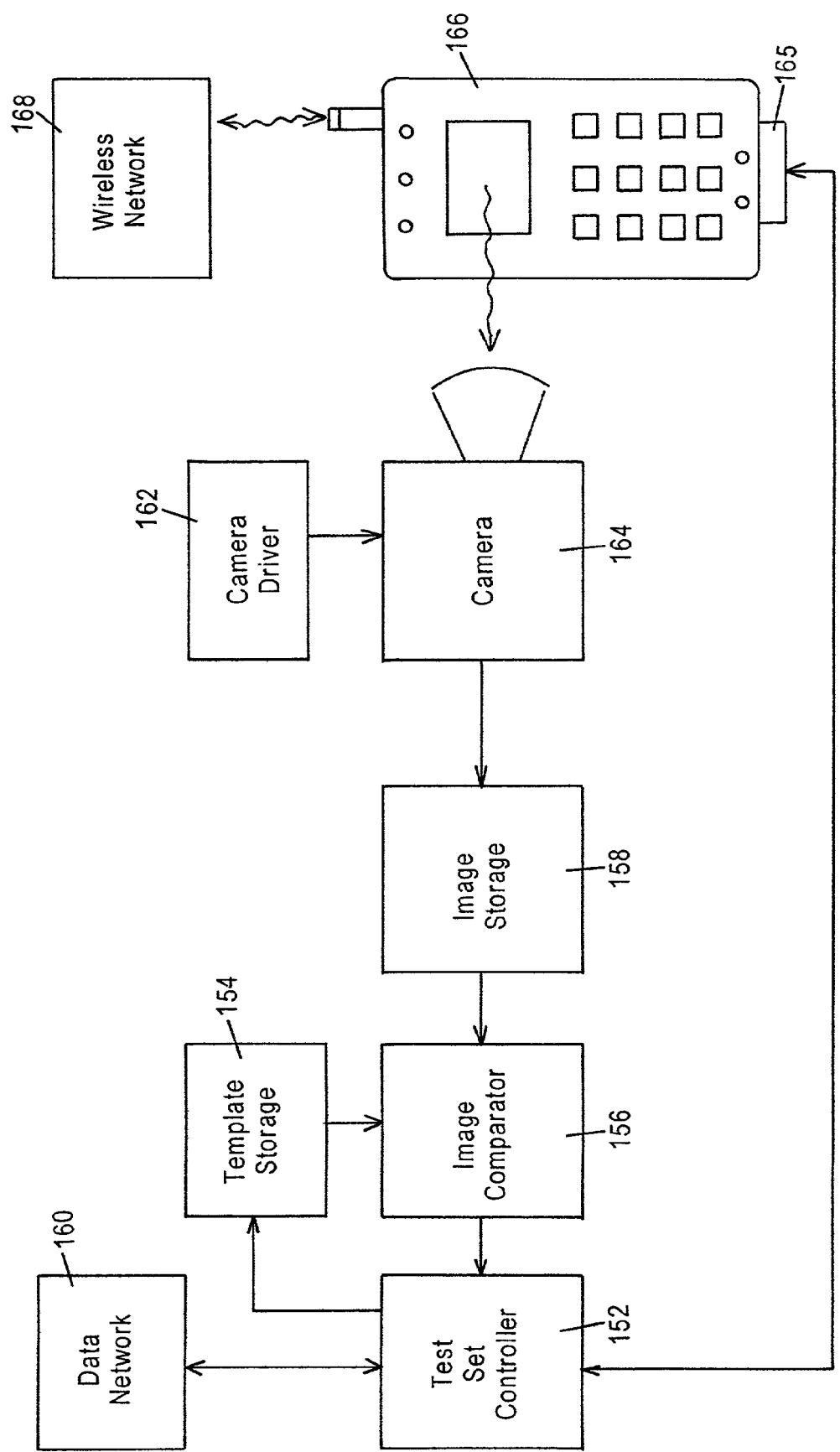
FIG. 7 is a block diagram useful in explaining the operation of one embodiment of the inventive test set.

FIG. 7 is a functional block diagram of the operation of a video capturing device in a test set. A test set controller 152 is electrically connected to a modular wireless telephone 166 through data port 165 in the wireless telephone 166. It is through the data port 165 that the test set controller 152 can operate the telephone 166 in much the same manner as a user normally operates the telephone through the keypad. In embodiments of the present invention, test set controller 152 can perform all the functions on the wireless telephone 166 through the data port 165 that a user can through the keys on the wireless telephone 166. Accordingly, the test set controller 152, under command from the Central Test Control Center, can test the performance of the wireless telephone 166 from a wireless customers' perspective. This perspective includes placing calls, sending wireless message and other services which the wireless customer uses through operating the wireless telephone 166. The wireless telephone 166 also communicates with the wireless network 168. It is through the wireless network 168 that a Central Test Control Center sends test signals to the wireless telephone. It is also through the wireless network 168 the Central Test Control Central can receive signals from the wireless telephone 166 in the same protocol that is utilized by the particular wireless network 168 that the test set is situated. A camera 164 is located proximate to the display of the wireless telephone 166 to access the information output from the display. A camera driver 162 controls the operation of the camera 164. Further, the data gathered by the camera 164 is stored in an image storage mechanism 158. The image storage in the image storage mechanism 158 is compared in an image comparator 156 with anticipated display images stored in a template storage mechanism 154. The test set controller 152 can program the template storage 154 according to the anticipated display on the screen to test a feature. This information is often downloaded from and controlled by the Central Test Control Center for example each time a new telephone is installed in the test set. Such templates are and include indications of voice-mail, wireless internet data, and other icons and characters output on the display of the wireless telephone 166. Those skilled in the art would recognize that various types of character recognition can be used to accomplish the objectives of the present invention. The result of the image comparator 156 is input into the test set controller 152. This result is communicated to the Central Test Control Center through the data network 160.

The present invention relates to a test set for testing the service of a wireless telephone in a wireless network. The test set of the present invention is remotely controlled by a Central Test Control Center. The Central Test Control Center can reprogram the wireless telephone in the test set through a data port on the wireless telephone. The Central Test Control Center can also send wireless signals to the test set through the wireless network which are received by the wireless telephone. The Central Test Control Center tests a particular wireless telephone in a particular wireless network in which the test set is situated by receiving indications of the response of the wireless telephone to these wireless signals. In embodiments of the present invention, the wireless telephone is modular and can be implemented in the test set without hardwiring. In embodiments of the present invention, the modular wireless telephone is implemented in the test set through the use of a video capturing device and a controller that reads data directly from the display of the modular wireless telephone and deciphers information displayed on the display of the modular wireless telephone.

While the foregoing has described what is considered to be preferred embodiments of the invention, it is understood that various configuration modifications may be made therein and that the invention may be implemented in various forms and embodiments, and that it may be applied in numerous applications, only some of which have been described herein. It is intended for the following claims to claim any and all such modifications and variations which fall within the scope of the invention.

What is claimed is:

1. A test set for testing the operation of a wireless telephone in a wireless communication network comprising a plurality of mobile switching centers each providing wireless communications in respective service areas through a plurality of base stations, the test set being for location in one of the respective service areas, wherein:
   the test set is enabled to communicate with a central test control center;
   the test set comprises:
   (a) a wireless telephone for wireless communication with at least one of the base stations, the wireless telephone having a display;
   (b) a controller coupled to the wireless telephone for control of the wireless telephone, the controller also being coupled to a data link for communication with the central test control center for receiving test instructions from the center and supplying test result data to the center; and
   (c) a video capturing device visually coupled to the display of the wireless telephone, for capturing data from the display relating to operations of the wireless telephone and supplying the captured data to the controller,
   the controller processing the captured data to recover information output from the wireless telephone via the display, for inclusion in the test result data,
   the test set is arranged to receive instruction from the central test control center to initiate an operation through a base station and a mobile switching center to attempt to access a predetermined service feature of the wireless communication network.

2. A test set, wherein:
   the test set tests the operation of a wireless device in a wireless network;
   the test set is enabled to communicate with a central test control center through a data link coupled to the test set;
   the test sets comprises:
   (a) the wireless device for wireless communication with at least one base station of the wireless network;
   (b) a controller coupled to the wireless device for control of the wireless device, the controller also being coupled to the data link; and
   (c) a video capturing device visually coupled to a display of the wireless device for capturing data from the display relating to operations of the wireless device and supplying the captured data to the controller,
   the controller processing the captured data to recover information output from the wireless device via the display.

3. The test set of claim 2, further comprising:
   a wireless communication device comprising a control unit, a display, a keypad, a speaker, and a microphone;
   a controller electrically coupled to the wireless communication device;
   a test speaker electrically coupled to the controller and arranged to send auditory signals to an auditory input of the wireless device; and
   a test microphone electrically coupled to the controller and arranged to receive auditory signals from an auditory output of the wireless device.

4. The test set of claim 2, wherein the wireless device can be substituted by a second wireless device without hardwiring.

5. The test set of claim 2, wherein the wireless device is modular and detachable from the test set.

6. The test set of claim 2, wherein the video capturing device is arranged proximate to the display.

7. The test set of claim 2, wherein the data captured from the display comprises at least one of date indications, time indications, type of service indications, voice mail indications, caller ID indications, text messages, and wireless internet services.

8. The test set of claim 2, wherein the video capturing device is a CCD camera.

9. The test set of claim 2, wherein the wireless communication device is a digital telephone.

10. The test set of claim 2, wherein the wireless communication device is an analog telephone.

11. A method of testing the operation of a wireless telephone in a wireless communication network, wherein:
the wireless telephone network comprises a plurality of mobile switching centers each providing wireless communications in respective service areas through a plurality of base station;
a test set is located in one of the respective service areas;
a data link is coupled to the test set for enabling communication between a central test control center and the test set;
the test set comprises a wireless telephone for wireless communication with at least one of the base stations, wherein the wireless telephone comprises a display;
the test set comprises a controller that is coupled to the wireless telephone and to the data link, wherein the controller controls the operation of the wireless telephone according to data received by the data link;
the test set comprises a video capturing device visually coupled to the display of the wireless telephone, wherein the video capturing device is coupled to the controller;
the method comprises the following steps:
(a) initiating an operation through at least one base station and at least one mobile switching center to attempt to access a predetermined service feature of the wireless telephone;
(b) capturing data from the display of the wireless telephone;
(c) recovering information by the controller that is output from the wireless telephone via the display by processing the captured data to recover information output from the wireless telephone via the display; and
(d) supplying test result data to the central test control center according to the recovered information by the controller.

12. A method as in claim 11, further comprising the step of comparing the test result data at the central test control center with expected result data.

13. A method as in claim 11, wherein the initiating step is responsive to receipt of test instructions at the test set from the central test control center.

14. A method of testing the operation of a wireless communication device in a wireless network, wherein:
the wireless network comprises a plurality of mobile switching centers each providing wireless communications in respective service areas through a plurality of base stations;
a test set is located in one of the respective service areas;
a data link is coupled to the test set for enabling communication between a central test control center and the test set;
the test set comprises the wireless communication device for wireless communication with at least one of the base stations;
the test set comprises a video capturing device visually coupled to the wireless communication device;
the method comprises the following steps:
(a) initiating an operation of the wireless communication device through at least one base station and at least one mobile switching center;
(b) capturing data using the video capturing device from the wireless communication device; and
(c) supplying test result data to the central test control center related to the captured data.

15. A method as in claim 14, further comprising the step of comparing the test result data at the central test control center with expected result data.

16. A method in claim 14, wherein the initiating step is responsive to receiving of test instructions at the test set from a central test control center.

17. A method of testing a wireless service feature, comprising:
causing a wireless communication device to interact with a wireless communication network in an attempt to utilize the wireless service feature;
reading information from the wireless communication device relating to the attempt, using a video capturing device visually coupled to a display of the wireless communication device;
determining if the wireless service feature is functioning through the wireless communication device based on the information read from the wireless communication device; and
reprogramming the wireless communication device prior to using the video capturing device.

18. The method of claim 17, wherein the wireless communication device is reprogrammed by a controller that is electrically coupled to the wireless communication device.

19. The method of claim 17, further comprising receiving a wireless signal at the wireless communication device, wherein:
at least part of the information contained in the wireless signal originated from a central test control center;
the video capturing device is electrically coupled to a controller;
the controller is in communication with the central test control center.

20. The method of claim 19, wherein the communication with the central test control center is wireless communication.

21. The method of claim 19, wherein the communication with the central test control center is wireline communication.

22. The method of claim 19, wherein the wireless device feature is a voice activation feature.

23. The method of claim 17, wherein the method tests the operation of the wireless communication network.

24. The method of claim 17, wherein the method tests the operation of the wireless communication device.

25. A method of testing a wireless service feature, comprising:
causing a wireless communication device to interact with a wireless communication network in an attempt to utilize the wireless service feature, the interaction with the communication network including receiving a wireless signal at the wireless communication device, wherein at least part of the information contained in the wireless signal originated from a central test control center;
reading information from the wireless communication device relating to the attempt, using a video capturing device visually coupled to a display of the wireless communication device, the video capturing device being electrically coupled to a controller, and the controller being in communication with the central test control center;
determining if the wireless service feature is functioning through the wireless communication device based on the information read from the wireless communication device; and reading information from the wireless communication device using a microphone prior to determining if a wireless device feature is functioning, wherein the microphone is electrically coupled to the controller.

26. A method of testing a wireless service feature, comprising:

causing a wireless communication device to interact with a wireless communication network in an attempt to utilize the wireless service feature, the interaction with the communication network including receiving a wireless signal at the wireless communication device, wherein at least part of the information contained in the wireless signal originated from a central test control center;

reading information from the wireless communication device relating to the attempt, using a video capturing device visually coupled to a display of the wireless communication device, the video capturing device being electrically coupled to a controller, and the controller being in communication with the central test control center;

determining if the wireless service feature is functioning through the wireless communication device based on the information read from the wireless communication device; and sending an audio signal to the wireless communication device from a speaker proximate to the wireless communication device, prior to determining if a wireless device feature is functioning, wherein:

the speaker is electrically coupled to the controller;

at least part of the information contained in the audio signal originated from the central test control center; and at least part of the information contained in the audio signal is test information to test a wireless device feature.

27. A test system for testing operations in a wireless communication network comprising a plurality of mobile switching centers each providing wireless communications in respective service areas through a plurality of base stations, the test system comprising:

a plurality of test sets, wherein at least one of the test sets is located in each of the respective service areas;

a central test control center;

a plurality of data links coupled to the test sets, for enabling communication between the central test control center and the test sets;

each of the test sets comprising:

(a) a wireless telephone for wireless communication with at least one of the base stations, the wireless telephone having a display;

(b) a controller coupled for control of the wireless telephone, the controller also being coupled to one of the data links for communication with the central test control center for receiving test instructions from the central test control center and supplying test result data to the central test control center; and (c) a video capturing device visually coupled to the display of the wireless telephone, for capture data from the display relating to operations of the wireless telephone and supplying the captured data to the controller, the controller processing the captured data to recover information output from the wireless telephone via the display, for inclusion in the test result data, wherein the central test control center instructs the test set to initiate an operation through a base station and a mobile switching center to attempt to access a predetermined service feature of the wireless communication network, and during the operation, the controller supplies test result data including data captured from the display of the wireless telephone, the test result data relating to the attempt to access the predetermined feature through one of the mobile switching centers for comparison to expected result data.

28. A test system for testing operations in a wireless network comprising a plurality of mobile switching centers each providing wireless communications in respective service areas through a plurality of base stations, the test system comprising:

a test set that comprises a wireless communication device and tests the operation of the wireless communication device in a wireless network, wherein the wireless communication device is in wireless communication with at least one base station of the wireless network;

a data link that is coupled to the test set, for enabling communication between a central test control center and the test sets;

a controller, as part of the test set, coupled to the wireless communication device for control of the wireless device, the controller also being coupled to the data link; and a video capturing device, as part of the test set, visually coupled to the wireless communication device for capturing visual data from the wireless communication device and supplying the captured visual data to the controller, wherein the controller processes the captured data to recover information output from the wireless device.

* * * * *